Aug. 12, 1924.
T. T. BURCHELL
1,504,936
TRANSMISSION GEAR MECHANISM
Filed April 29, 1924   3 Sheets-Sheet 1.
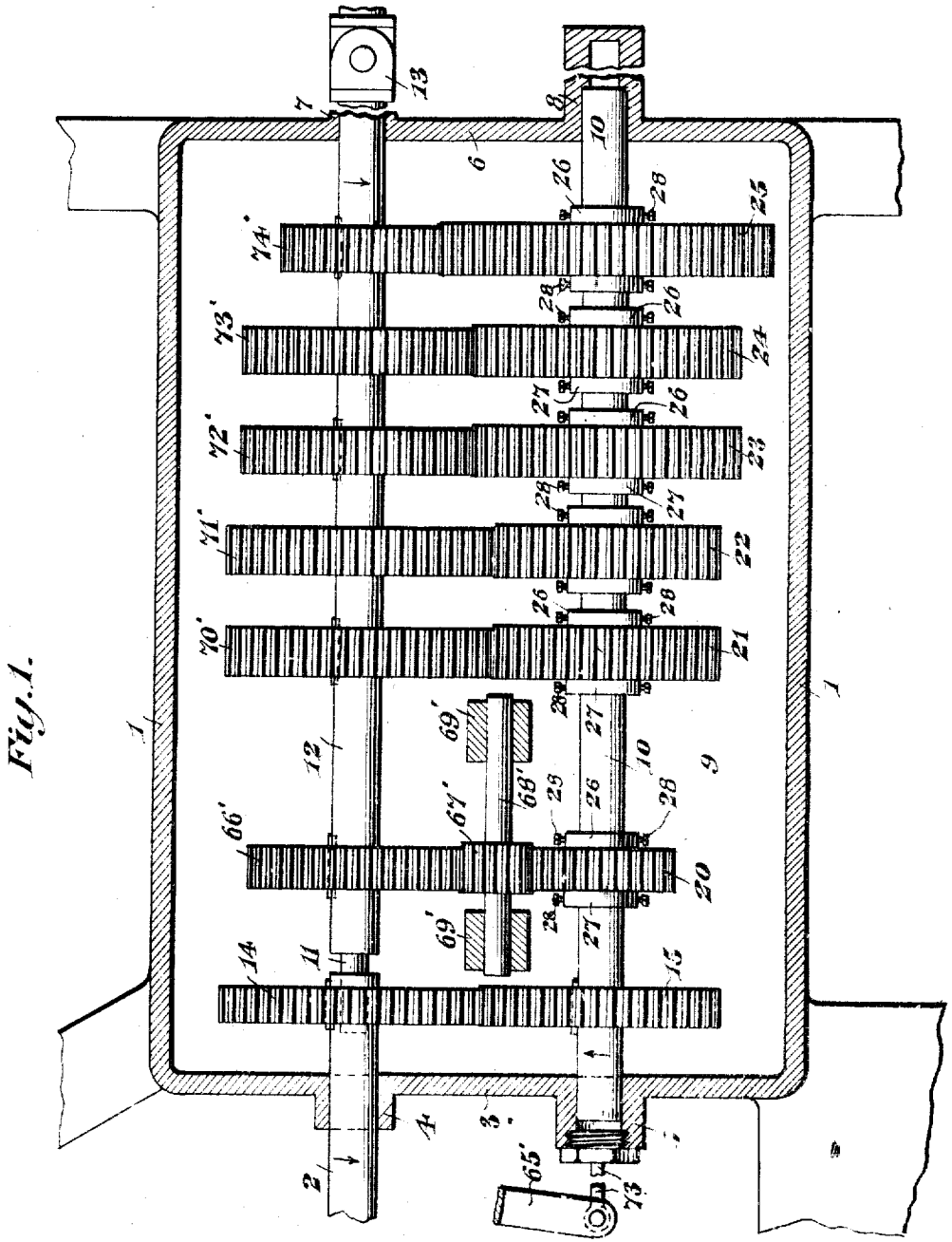
T. T. Burchell, INVENTOR.
BY Geo. F. Kimmel ATTORNEY.

Aug. 12, 1924.  
T. T. BURCHELL  
TRANSMISSION GEAR MECHANISM  
Filed April 29, 1924 3 Sheets-Sheet 2
1,504,936
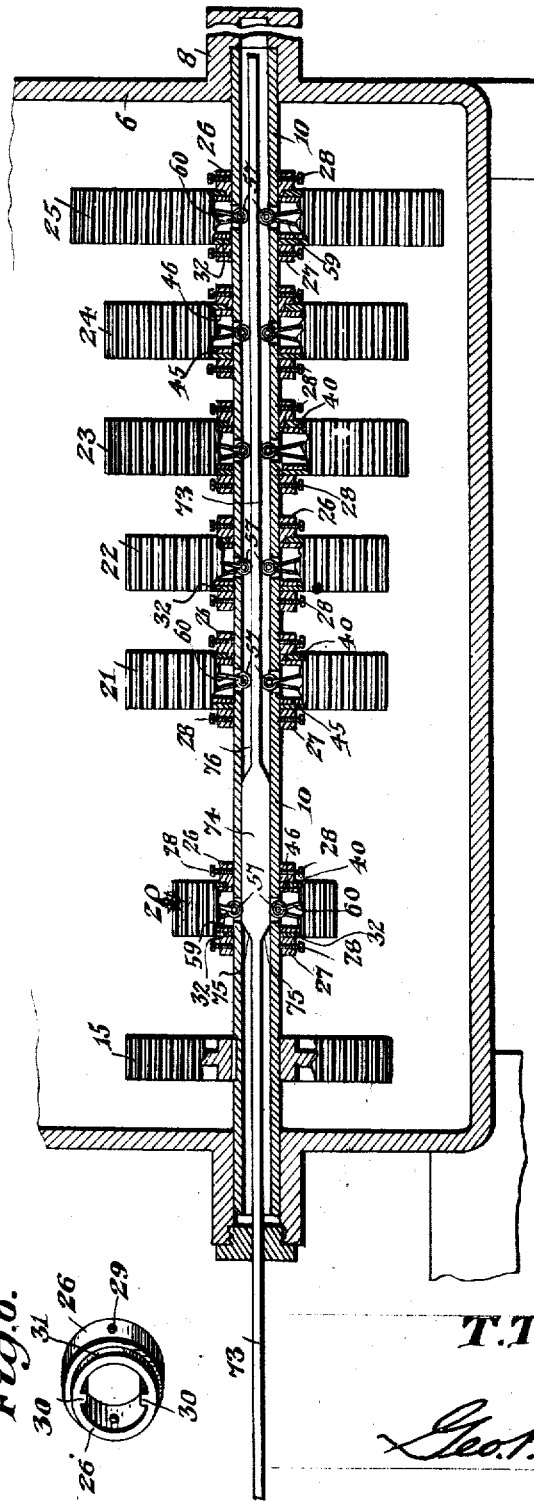
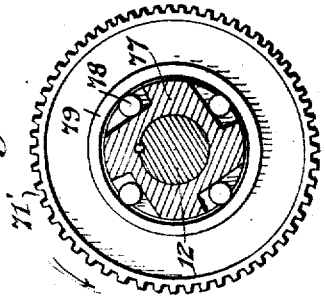
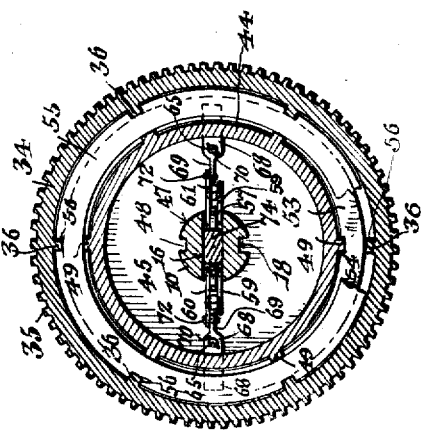
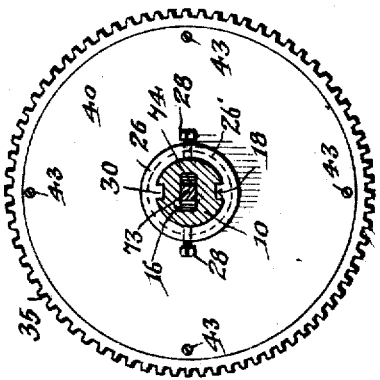
T.T.Burchell, INVENTOR.
BY Geo. P. Kimmel
ATTORNEY.

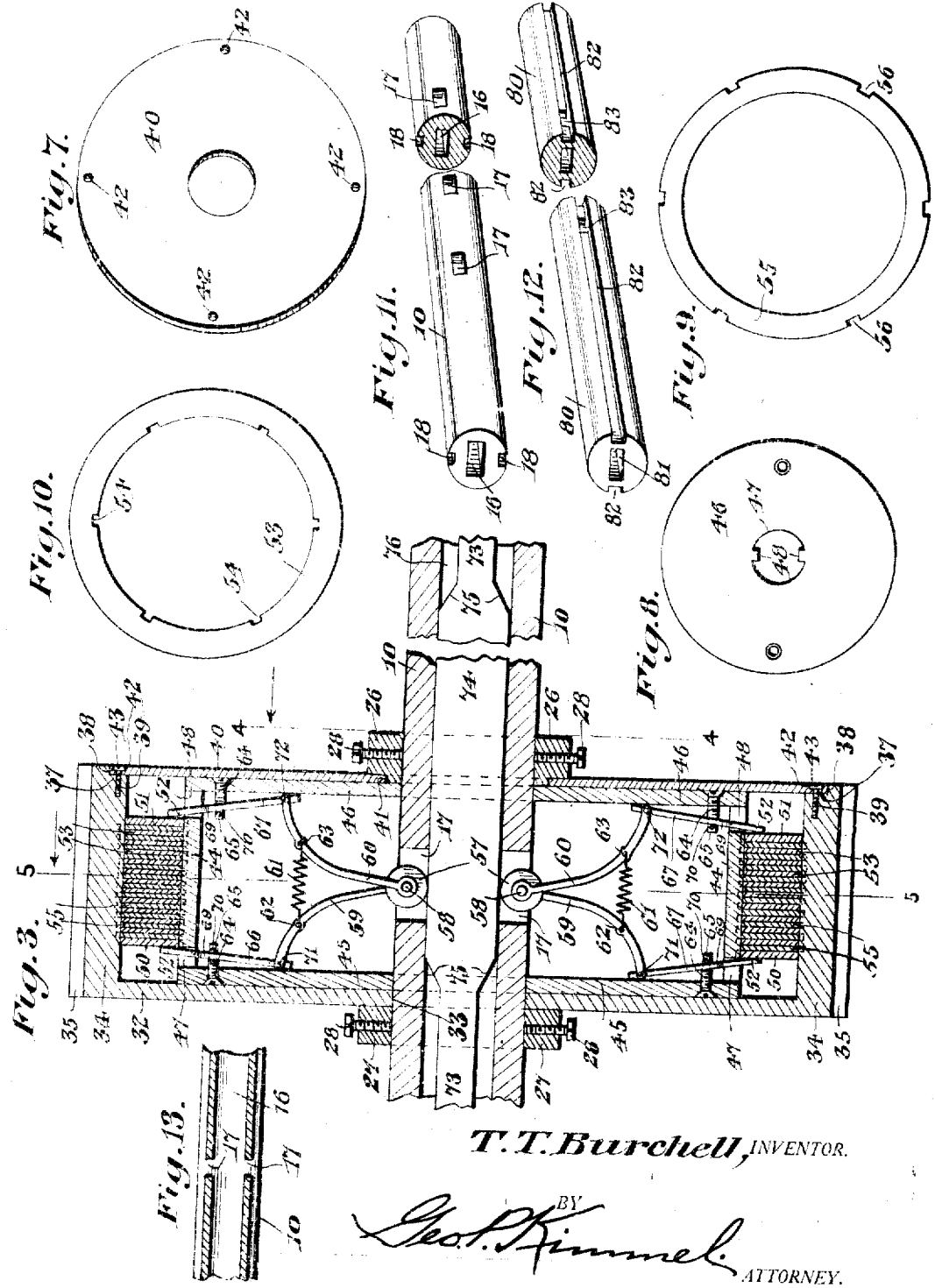

Patented Aug. 12, 1924.

1,504,936

UNITED STATES PATENT OFFICE.

THEOPHILUS T. BURCHELL, OF MANCHESTER, KENTUCKY.

TRANSMISSION-GEAR MECHANISM.

Application filed April 29, 1924. Serial No. 709,808.

*To all whom it may concern:*

Be it known that I, THEOPHILUS T. BURCHELL, a citizen of the United States, residing at Manchester, in the county of Clay and State of Kentucky, have invented certain new and useful Improvements in Transmission-Gear Mechanism, of which the following is a specification.

This invention relates to a transmission gear mechanism of the speed change type for motor vehicles, and has for its object to provide, in a manner as hereinafter set forth, a mechanism of such class with means whereby the speed of the vehicle may be changed at will without varying that of the engine and without releasing the engine clutch, as well as providing for varying the speed of the vehicle without causing any noticeable shock.

A further object of the invention is to provide, in a manner as hereinafter set forth, a transmission gear mechanism of the speed change type including means which will at all times exert power upon the driven shaft while going from a lower to a higher speed.

A further object of the invention is to provide a transmission mechanism of the speed change type, in a manner as hereinafter set forth and with means by shifting to neutral from low gear will answer the same purpose as the clutch now employed between the motor and a transmission.

Further objects of the invention are to provide, in a manner as hereinafter set forth, a transmission gear mechanism of the speed change type, which is simple in its construction and arrangement, strong, durable, compact, thoroughly efficient and convenient in its use, readily assembled and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a section plan of a transmission gear mechanism in accordance with this invention.

Figure 2 is a fragmentary view in longitudinal section, illustrating the driven shaft of the transmission and the driving gear elements carried thereby.

Figure 3 is a vertical sectional view of one of the driving gear elements.

Figure 4 is a section on line 4—4, Figure 3.

Figure 5 is a section on line 5—5, Figure 3.

Figure 6 is a perspective view of a retainer collar employed in connection with a driving gear element.

Figure 7 is a perspective view of the removable side plate of a driving gear element.

Figure 8 is an end view of the drum forming an element of a frictional clutch used in connection with each of the driving gear elements.

Figures 9 and 10 are front views of the different forms of friction rings employed in connection with each clutching device.

Figure 11 is a perspective view, broken away, of the driven shaft of the transmission.

Figure 12 is a like view, broken away, of a modified form of driven shaft.

Figure 13 is a fragmentary view, in section, of the form of driven shaft shown in Figure 12.

Figure 14 is a fragmentary view, in section, of one of the driven gear elements and its ratchet or clutching connecting with respect to the driving or propeller shaft.

Referring to the drawings in detail, 1 denotes a housing having extending therein, at one end thereof, the motor or engine shaft 2. That end of the housing through which extends the shaft is indicated at 3 and provided with a bearing 4 for the shaft 2. Below the bearing 4 the end 3 of the housing 1 is formed with a bearing 5. The other end of the housing is indicated at 6 and is formed on its outer face with a bearing 7, arranged in alignment with the bearing 4 and below the bearing 7, the end 6 is formed with a bearing 8, which is arranged opposite the bearing 5.

Mounted in the bearings 5, 8, and extending through the chamber 9 formed by the housing 1, is a driven shaft 10, and loosely connected with that end of the shaft 2 within the chamber 9 is the end 11 of a driving or propeller shaft 12 which extends through the bearing 7. If the shaft 12 is formed of two sections, one of the sections is provided with a universal joint connection 13, so that one section will be connected to the other by the joint 13. Keyed to that end of the motor or engine shaft 2 extended within the chamber 10, is a gear wheel 14 which permanently meshes with a gear wheel 15 of the same diameter and which is keyed to the driven shaft 10. On the operation of the shaft 2, the gear 14 acting on the gear 15 will drive the shaft 10 and during the operation of the shaft 2 the shaft 10 will be synchronously operated therewith.

The shaft 10 is formed from end to end with a lengthwise extending rectangular bore 16 which is open at each end. The bore 16 is also disposed diametrically with respect to the shaft 10, and the latter is furthermore provided with two series of spaced rectangular openings 17. The openings of each series at their inner ends communicate with the sides of the bore 16 and at their outer ends open at the periphery of the shaft 10. The number of openings of a series corresponds to the number of speed change driving gear elements carried by the shaft 10, and by way of example, the number of speed change driving gear elements illustrated is six, but it is obvious that this number can be increased or diminished if desired. The openings of one series align with the openings of the other series.

The shaft 10 has its periphery formed with a pair of lengthwise extending grooves 18 which are diametrically disposed with respect to each other, extends from one end to the other end of the shaft, and disposed at right angles to the openings 18.

Carried by the shaft 10 is a reversing driving gear element 20, of smaller diameter than the gear 15, and also mounted upon the shaft 10 is a pair of forwardly driving speed change gear driving elements 21 and 22 of the same diameter and of less diameter than the gear 15, a pair of forwardly driving speed change gear driving elements 23, 24 of greater diameter than the gear 15 and elements 21, 22, and a forwardly driving speed change gear driving element 25 of greater diameter than the elements 23 and 24. The elements 21 and 22 are for low speed, elements 23, 24 for intermediate speed, and element 25 for high speed.

Each of the speed change gear driving elements is of the same construction, and, therefore, but one will be described as the description of one will apply to each of the other speed change gear driving elements.

The construction of each of the speed change gear driving elements is best shown in Figures 3 to 10, both inclusive, and each of said elements consists of a pair of spaced retaining collars 26, 27, secured in position by set screws 28 threadedly engaging with the collars and further binding against the shaft 10. Openings 29, having threaded walls, are provided for the screws 28. The collar 26 is formed with a reduced annular extension 26', having its inner face formed with a pair of diametrically opposed lugs 30, which engage in the grooves 18 of the shaft 10. The outer face 31 of the extension 26' provides a bearing surface for a purpose to be presently referred to. The set of clamping screws 28 for the collars 26 and 27 may if desired have threaded engagement with the shaft 10.

Each of said elements further includes a gear member consisting of a circular web 32, having an opening 33 for the purpose of mounting the web 32 upon the shaft 10. The web 32 is positioned against the collar 27. Integral with the outer portion of the web 32 and in section disposed at right angles with respect to the web 32, is an annulus 34 of substantial width and which has its outer face provided circumferentially throughout with transversely extending spaced teeth 35. Integral with the inner face of the annulus 34 is a series of transversely extending spaced lugs 36, and one end of each of said lugs is inset with respect to one edge of the annulus to provide a ledge 37 and a shoulder 38. The inset end of each lug 36 is formed with a socket 39, having a threaded wall.

Mounted upon the bearing surface 31 is a removable circular closure plate 40, provided centrally with an opening 41 for mounting on the extension 26' of the collar 26. The plate 40 has a series of spaced openings 42 in proximity to its edge, and the said plate 40 is positioned against the ledge 37 and the shoulder 38. The outer face of the plate 40 is flush with one edge of the annulus 34. The openings 42 register with the sockets 39 and extending through said openings 42 and engaging the threaded walls of the sockets 39 are countersunk hold-fast devices 43, for detachably connecting the plate 40 to the annulus 34.

The gear member is loosely mounted on the shaft 10, and is adapted to be coupled thereto so as to revolve bodily therewith, and for this purpose a clutching device is employed consisting of a drum formed of an annular body portion 44 and a pair of heads 45, 46, each provided with an opening 47 for mounting upon the shaft 10. The wall of the opening 47, of each head, is provided with a pair of diametrically opposed lugs 48, which engage in the grooves 18 of the shaft 10, so that the drum will be carried at all times with the shaft 10, or in other words, the drum revolves bodily with the shaft 10.

The body portion 44 of the drum is arranged between and fixedly secured to the heads 45, 46, as well as having its outer face flush with the edges of the heads 45, 46. The body portion 44 of the drum, is formed with two pair of slots and with one pair diametrically opposed with respect to the other pair. The slots of each pair are indicated at 47, 48, and are closed at their outer ends by the heads 45, 46. The slots of each pair are arranged in lengthwise alignment and disposed transversely with respect to the body portion 44. The slots of one pair are arranged in alignment with respect to the slots of the other pair and each of the slots of each pair is of a length materially less than half the width of the body portion 44.

The outer face of the drum is formed with a series of spaced ribs 49, which oppose the lugs 36, and said ribs 49 are of the same length as the width of the drum and certain of the lugs 49 are intersected by the slots 47, 48.

Mounted on the body portion 44, between the slots of each pair of slots is a pair of spaced shiftable clamping members 50, 51, which are notched, as at 52, for the reception of the ribs 49, whereby said clamping members 50 and 51 will bodily rotate with the drum. The clamping members 50, 51 extend to the lugs 36, but are not in binding contact therewith.

Mounted on the body portion 44, of the drum, is a series of friction clutching rings 53, and each of which has its inner edge formed with a series of spaced notches 54 for the reception of the ribs 49, whereby the rings 53 will bodily revolve with the drum.

Surrounding the body portion 44 of the drum, is a series of frictional clutching rings 55, each having its outer edge formed with a series of notches 56, for the reception of the lugs 36, whereby said rings when in clutching position will provide for the revolving of the gear member bodily with the drum.

The rings 53 and 55 are alternately disposed with respect to each other, and the outer rings of the series of rings 53 are positioned against the clamping members 50, 51. See Figure 3.

Under normal conditions, the clamping members 50, 51 and clutching rings 53 and 54, are out of clutching engagement but when the clamping members 50, 51 are shifted towards each other, the action of said clamping members upon the rings 53, 55, will be such as to bind said rings frictionally together, under such conditions clutching the gear member with the drum so that said gear member, drum and shaft 10 will bodily revolve. Associated with the clutching devices within the gear members, is a pair of oppositely disposed spring controlled shifting mechanisms therefor, and as each shifting mechanism of a pair is of the same construction, but one will be described, as the description of one will apply to both.

Each of the shifting mechanisms consists of a circular disk 57, having fixed to its axis as well as projecting from each face thereof a pivot 58, and upon the ends of said pivot 58 is pivotally mounted a pair of oppositely extending curved arms 59, 60, connected together by a coiled pulling spring 61. One end of the spring 61 is fixedly secured, as at 62, to the outer portion of the arm 59, and the other end of the spring 61 is fixedly secured, as at 63, to the outer portion of the arm 60.

Secured to the head 45, in proximity to each slot 47, is an inwardly extending fulcrum member 64. Secured to the head 46, as well as projecting inwardly therefrom and arranged in close proximity to each slot 48 is a fulcrum member 65.

Extending through each slot 47, into the drum is a shifting arm 66 for the clamping member 50. Extending through each slot 48, into the drum, is a shifting arm 67 for the clamping member 51. The outer portion 68 of the arm 66, as well as the arm 67, is of greater width than the inner portion 69 thereof. See Figure 5. The outer portion 68 of each of said arms is provided with an opening near its inner end for mounting upon a fulcrum member. The outer portions 68 of the arms 66 are mounted on the fulcrum members 64, and the outer portions 68 of the arms 67 are mounted on the fulcrum members 65. The shifting arms are retained on the fulcrum members by cotter pins 70. See Figure 5. The reduced inner portions 69 of the arms 66 are pivotally connected, as at 71, to the outer ends of the arms 59. The reduced inner portions 69 of the arm 67 are pivotally connected, as at 72, to the outer ends of the arms 60.

The disks 57 of each pair of shifting devices extends through a pair of openings 17 and normally project within the bore 16 and in the path of a controller bar, to be presently referred to. The disks 57 of the shifting mechanisms, when said mechanisms are mounted to operative position, shift away from each other and when said mechanisms are released the springs 61 act to move said mechanisms to inoperative position, as indicated in dotted lines, Figure 3. When the pair of oppositely disposed shifting devices is operated they act upon the clamping members 50, 51 to clamp the rings 53 and 55 together, whereby the said rings will set up a frictional clutching action, causing thereby the operation of the gear member with the drum and shaft 10.

Slidably mounted in the bore 16 of the shaft 10 is a controller bar 73, provided intermediate its ends with an enlargement 74, having each end thereof bevelled, as at 75, and with the bevelled ends oppositely disposed with respect to each other. The enlargement 74 constitutes an actuating cam for the shifting mechanisms. The enlargement 74 has a snug sliding fit with the side walls of the bore 16, and the length of the enlargement 74 is such to engage two pair of shifting mechanisms simultaneously, or in other words, to act upon a pair of forwardly driving speed change gear driving elements at one time, but not of a length to engage three. The enlargement 74 constitutes a double acting cam so that when the bar 73 is shifted in one direction, one end of the enlargement 74 will engage a pair of opposed shifting mechanisms and synchronously actuate them, and when the bar 73 is shifted in the other direction, the other bevelled end of the enlargement 74 will engage and synchronously actuate a pair of opposed shifting mechanisms.

The controller bar 73 projects from one end of the shaft 10, as well as from the bearing 5, and is connected to an operating element 65' therefor.

The reversing speed change gear driving element is arranged between the gear 15 and the speed change gear driving element 21, and the distance between the elements 20 and 21 is greater than the distance between the elements 21 and 22, between elements 22 and 23, between elements 23 and 24, between elements 24 and 25, and between the gear 15 and the element 20, and that portion of the bore of the shaft 10 between the elements 20 and 21, as indicated at 76, provides what may be termed a neutral space for the enlargement or double acting cam 74. When the cam 74 is in the space 76, each of the speed change gear driving elements is disconnected from the shaft 10.

Keyed to the driving shaft 12 and arranged in alignment with the element 20 is a gear 66' of greater diameter than the said element 20, and interposed between the gear 66' and the element 20 is an idler pinion 67', carried by a shaft 68', mounted in bearings 69'. The pinion 67 in connection with the element 20 and gear 66' provides for reverse drive of the shaft 12 from the shaft 10.

Keyed to the shaft 12 is a gear 70' which meshes with and is of greater diameter than said element 21. Loosely mounted on the shaft 12, is a gear 71', which meshes with and is of greater diameter than the element 22. The gear 71' is of the same diameter as the gear 70'. Keyed to the shaft 12 is a gear 72', which meshes with and is of less diameter than the element 23. The gear 72' is of less diameter than the diameter of the gear 71'. Loosely mounted on the shaft 12 is a gear 73' which meshes with the element 24 and is of the same diameter as the gear 72'. Keyed to the shaft 12, is a gear 74' which meshes with and is of materially less diameter than the diameter of the element 25. The gear 74' is of less diameter than the gear 73'.

The gears 71' and 73', as before stated, are loose on the shaft 12 but have cooperating therewith a clutch or ratchet device for the purpose of connecting said gears with the shaft 12. By way of example, the gears 71' and 73' can be set up in the manner as shown in Figure 14, and by reference thereto the shaft 12 has keyed thereto a clutching member 77, provided with a series of globular members 78 engageable with a collar 79, carried by the gear for the purpose of clutching the latter to the shaft 12.

In the modified form of driven shaft illustrated in Figures 12 and 13, the shaft is indicated at 81 and is formed with a rectangular bore 81 similar to the bore 16. The shaft 80 has its periphery provided with a pair of diametrically opposed lengthwise extending grooves 82 having the bottoms thereof formed with openings 83 in which are to be arranged the disks 57 of the shifting mechanisms. The difference between the shaft 80 and the shaft 10, is that the openings 17 in the shaft 10 are disposed at right angles to the groove 18, whereas the openings 83 in the shaft 80 which correspond to the openings 17 are arranged at the bottom of the grooves 82, which correspond to the grooves 18 of the shaft 10.

As illustrated and described, the gear 14 is keyed to the shaft 2, gear 15 to the shaft 10 and gears 66', 70', 72', and 74' to the shaft 12. The gears 70', 72' and 74' each provides a solid working gear in case it is desired to employ the engine as a brake when slowly coasting down hill.

Gears 71' and 73' are normally loose on the shaft 12, but either one can be clutched therewith for the purpose of applying power thereto. Gear 71' is clutched to the shaft 12 when driven from element 22 when the latter is clutched to the shaft 10. Gear 73' is clutched to the shaft 12 when driven from element 24 when the latter is clutched to the shaft 10.

The gears 70' and 71' are of the same diameter and of the same ratio to elements 21, 22. The gears 70' and 71' are driven by the elements 21, 22 simultaneously when operating at low speed, but during the speed change operation from low to intermediate speed, gear 71' is only operated, due to the fact that element 21 is unclutched from shaft 10 as cam 74 clears the clutching mechanism for element 21 before it clears the clutching mechanism for element 22. The gears 72' and 73' are of the same diameter and of the same ratio to elements 23 and 24. The gears 72' and 73' are driven by the elements 23 and 24 simultaneously when operating at intermediate speed, but during the speed change operation from intermediate to high speed gear 73' is only operated, due to the fact that element 23 is unclutched from shaft 10 as cam 74 clears the clutching mechanism for element 23 before it clears the clutching mechanism for element 24. Gear 74' is driven from element 25 when driving at high speed.

The clutching gears 71' and 73' provide means to prevent the loss of power while going from a lower to a higher speed, or in other words, by the employment of the clutching gears and their associated driving elements power will be exerted at all times on the propeller shaft 12 while going from a lower to a higher speed.

It will be assumed that elements 21 and 22 are clutched to and driven from the shaft 10, and when so clutched gears 70' and 71' will be driven from the elements 21 and 22 and the propeller shaft operated. Now in going from element 22 to element 23, to change speed, the cam 74 first clears the clutching mechanism for element 21 and releases the latter from the shaft 10, but owing to the length of the cam 74, element 22 is still in clutching engagement with shaft 10, whereby the gear 71' is driving shaft 12, due to the fact that gear 71' is in clutched driving engagement with the shaft 12 and will remain in such position until the cam 74 has clutched element 23 to shaft 10. At this time, shaft 12 will be operated at a greater speed, under such conditions providing for the unclutching of the gear 71' from the shaft 12 as the latter will out-run gear 71', necessarily unclutching therefrom, or in other words, gear 72' which is operated from the clutch element 23 will out-run gear 71', thereby unclutching the latter. By this arrangement no loss in power or any noticeable shock is present when going from lower to intermediate speed. A similar action is had when going from element 24 to element 25 with respect to the gears 73' and 74'.

The clutching gears 71' and 73' carry the shift without the necessity of throwing out the clutch or slowing down of the engine, or in other words, the element 22 and gear 71' and the element 24 and gear 73' provide a medium for the change from one speed to another to enable the shifting from a lower to a higher speed without throwing the engine clutch or causing a jerk or jolt.

The cam 74' is never in neutral position from the time it engages element 21 up to the time it engages element 25. The cam 74 never releases one gear until it engages another, and under such conditions the clutching gears are absolutely necessary.

By shifting the bar 73, the various driving elements are coupled to the shaft 10 so as to drive the associated gear. The element 20 is for reverse drive and to operate the same it requires the cam 74 to pass through the neutral space 75 before it engages the shifting devices within said element for the purpose of operating such device to clutch said element 20 to the shaft 10.

The operating means for the controller bar 73 may have any provision such as a lug or spring to prevent shifting from low speed to high speed too suddenly.

It is thought that the many advantages of a speed change gear driving mechanism, in accordance with this invention can be readily understood, and the preferred embodiment of the invention is as illustrated and described, yet changes in the details of construction can be had which will fall within the scope of the invention as claimed.

What I claim is:—

1. A transmission gear mechanism comprising a driven shaft, means operated from the motor of the vehicle for continuously operating said shaft during the operation of the motor, a driving shaft, a plurality of pairs of speed change gears mounted on said driving shaft, the gears of each pair being of the same diameter and one fixed to and the other clutching with said driving shaft, the gears of one pair being of a different diameter with respect to the gears of the other pair, a plurality of pairs of speed change driving elements mounted in inactive position on said driven shaft, said elements permanently meshing with said gears, the elements of each pair being of the same diameter and of a different diameter with respect to the elements of the other pair, each of said elements including means for clutching it in an active position on the driven shaft, and a cam element mounted in the driven shaft for selectively coupling synchronously a plurality of said elements to said driven shaft.

2. A transmission gear mechanism comprising a driven shaft, means operated from the motor of the vehicle for continuously operating said shaft during the operation of the motor, a driving shaft, a plurality of pairs of speed change gears mounted on said driving shaft, the gears of each pair being of the same diameter and one fixed to and the other clutching with said driving shaft, the gears of one pair being of a different diameter with respect to the gears of the other pair, a plurality of pairs of speed change driving elements mounted in inactive position on said driven shaft, said element permanently meshing with said gears, the elements of each pair being of the same diameter and of a different diameter with respect to the elements of the other pair, each of said elements including means for clutching it in an active position on the driven shaft, a cam element mounted in the driven shaft for selectively coupling synchronously a plurality of said elements to said driven shaft, a gear carried by the driving shaft, a pinion meshing therewith for reversing the drive thereof, and a gear drive element normally inactive on said driven shaft and meshing with said pinion and including means operated from the cam element for clutching it in active position with respect to the driven shaft.

3. A transmission gear mechanism comprising a driven and a driving shaft, a plurality of pairs of speed change gears mounted on one of said shafts, the gears of each pair being of the same diameter and one fixed to and the other clutching with such shaft, the gears of one pair being of a different diameter with respect to the gears of the other pairs, a plurality of pairs of speed change gear driving elements mounted in inactive position on the other of said shafts, said elements permanently meshing with said gears, the elements of each pair being of the same diameter and of a different diameter with respect to the elements of the other pair, each of said elements including means for clutching it in an active position on its respective shaft, and a cam element mounted in that shaft carrying said elements for selectively coupling synchronously a plurality of said elements to their shaft.

4. A transmission gear mechanism comprising a driven shaft, a driving shaft, a plurality of pairs of speed change gears mounted on said driving shaft, the gears of each pair being of the same diameter and one permanently fixed to and the other clutching with said driving shaft, the gears of one pair being of a different diameter with respect to the gears of the other pair, a plurality of pairs of speed change gear driving elements mounted in inactive position on said driven shaft, said elements permanently meshing with said gears, the elements of each pair being of the same diameter, the elements of one pair being of a different diameter with respect to the other pair, each of said elements including means for clutching it in an active position on the driven shaft, and a cam element mounted in the driven shaft for selectively coupling said elements to said driven shaft.

5. A transmission gear mechanism comprising a driven shaft, a driving shaft, a plurality of pairs of speed change gears mounted on said driving shaft, the gears of each pair being of the same diameter and one permanently fixed to and the other clutching with said driving shaft, the gears of one pair being of a different diameter with respect to the gears of the other pair, a plurality of pairs of speed change gear driving elements mounted in inactive position on said driven shaft, said elements permanently meshing with said gears, the elements of each pair being of the same diameter, the elements of one pair being of a different diameter with respect to the other pair, each of said elements including means for clutching it in an active position on the driven shaft, and means mounted in the driven shaft and provided with a cam element for synchronously coupling one pair of elements or an element of opposed pairs of elements to said driven shaft.

6. A transmission gear mechanism comprising a driven shaft, a driving shaft, a pair of speed change gears mounted on said driving shaft and of the same diameter with respect to each other, one of said gears being permanently fixed to and the other clutching with said driving shaft, a speed change gear permanently fixed to said driving shaft and opposing and spaced from the gear clutching with the driving shaft, a pair of speed change gear driving elements mounted in inactive position on said driven shaft and each of the same diameter and permanently meshing with said pair of speed change gears, a speed change gear driving element mounted in inactive position on said driven shaft and permanently meshing with said single speed change gear, each of said elements including means for clutching it in an active position on the driven shaft, and means mounted in said driven shaft for synchronously coupling said pair of speed change gear driving elements to said driven shaft and further for synchronously coupling one of the elements of said pair and said single element to the driven shaft.

In testimony whereof, I affix my signature hereto.

THEOPHILUS T. BURCHELL.